United States Patent
Mendiboure et al.

(10) Patent No.: US 9,494,795 B2
(45) Date of Patent: Nov. 15, 2016

(54) METHOD OF MANUFACTURING AN OPTICAL ELEMENT, OPTICAL ELEMENT AND DISPLAY DEVICE

(76) Inventors: Andre Mendiboure, Reuil Malmaison (FR); Sebastien Hervy, Liancourt St Pierre (FR); Philippe Fedorawiez, Triel-sur-Seine (FR)

( * ) Notice: Subject to any disclaimer, the term of this patent is extended or adjusted under 35 U.S.C. 154(b) by 401 days.

(21) Appl. No.: 14/130,275

(22) PCT Filed: Jun. 29, 2012

(86) PCT No.: PCT/EP2012/002748
§ 371 (c)(1),
(2), (4) Date: May 8, 2014

(87) PCT Pub. No.: WO2013/004363
PCT Pub. Date: Jan. 10, 2013

(65) Prior Publication Data
US 2014/0268357 A1    Sep. 18, 2014

(30) Foreign Application Priority Data

Jul. 1, 2011    (DE) .................. 10 2011 106 329
Sep. 30, 2011    (FR) ..................... 11 02972

(51) Int. Cl.
*G02B 27/00*    (2006.01)
*G02B 27/01*    (2006.01)
(Continued)

(52) U.S. Cl.
CPC ......... *G02B 27/0149* (2013.01); *B29C 43/146* (2013.01); *B29C 45/0053* (2013.01); *B29C 51/266* (2013.01); *B29D 11/00865* (2013.01);
(Continued)

(58) Field of Classification Search
CPC .............. G02B 27/0149; G02B 27/01; G02B 2027/0196; G02B 2027/0156; G02B 2027/0194; B29C 51/266; B29C 43/146; B29C 45/0053; B29D 11/00865; Y10T 428/31504; Y10T 428/24521
See application file for complete search history.

(56) References Cited

U.S. PATENT DOCUMENTS

| 3,956,540 A | 5/1976 | Laliberte et al. |
| 5,750,060 A | 5/1998 | Maus et al. |

(Continued)

FOREIGN PATENT DOCUMENTS

| CN | 1126321 | 7/1996 |
| CN | 1302726 | 7/2001 |

(Continued)

OTHER PUBLICATIONS

Chinese Office Action dated Apr. 3, 2015.
(Continued)

*Primary Examiner* — Joseph P Martinez
(74) *Attorney, Agent, or Firm* — Fletcher Yoder, P.C.

(57) ABSTRACT

An optical element, notably an optical element for creating a retractable sheet for use in a motor vehicle, has in the final state a three-dimensional shape resulting from forming of the optical element, the optical element being designed to have an extended shape comprising: a first main surface, a second main surface, and an edge surface. A method of manufacturing involves during a first step of the method, forming the optical element to give its final three-dimensional shape in terms of the first main surface, the second main surface and the edge surface. During a second step at least one of the surfaces of the optical element is cleaned. During a third step, a functional coating is applied to the first main surface and/or the second main surface.

12 Claims, 2 Drawing Sheets

(51) Int. Cl.
  *B29D 11/00*  (2006.01)
  *B29C 43/14*  (2006.01)
  *B29C 45/00*  (2006.01)
  *B29C 51/26*  (2006.01)

(52) U.S. Cl.
  CPC ....... *G02B 27/01* (2013.01); *B29C 2045/0079* (2013.01); *G02B 2027/0156* (2013.01); *G02B 2027/0194* (2013.01); *G02B 2027/0196* (2013.01); *Y10T 428/24521* (2015.01); *Y10T 428/31504* (2015.04)

(56) References Cited

U.S. PATENT DOCUMENTS

| | | | |
|---|---|---|---|
| 6,504,518 B1 * | 1/2003 | Kuwayama | G02B 27/01 340/980 |
| 2006/0284326 A1 * | 12/2006 | Weymouth, Jr. | G02B 1/105 264/1.32 |

FOREIGN PATENT DOCUMENTS

| | | |
|---|---|---|
| EP | 0 836 107 A2 | 4/1998 |
| JP | H02-148001 A | 6/1990 |
| JP | H04-0260004 A | 9/1992 |
| JP | H05-11201 A | 1/1993 |
| JP | H05-142499 A | 6/1993 |
| JP | H08-227498 A | 9/1996 |
| JP | 2000322918 A | 11/2000 |
| JP | 2004122751 A | 4/2004 |
| JP | 2004148638 A | 5/2004 |

OTHER PUBLICATIONS

Preliminary Report, Written Opinion & International Search Report for application No. PCT/EP2012/002748 mailed Jan. 16, 2014.
International Search Report for application No. PCT/EP2012/002748 mailed Jun. 29, 2012.
JP Application No. 2014-517509 Office Action Mailed Mar. 29, 2016; 20 Pages.

* cited by examiner

METHOD OF MANUFACTURING AN OPTICAL ELEMENT, OPTICAL ELEMENT AND DISPLAY DEVICE

CROSS REFERENCE TO RELATED APPLICATIONS

This application claims priority from and the benefit of PCT Application No. PCT/EP2012/002748, filed on Jun. 29, 2012; German Patent No. DE 10 2011 106 329.7, filed on Jul. 1, 2011; and French Patent FR 11/02972, filed on Sep. 30, 2011; all entitled "Method of Manufacturing an Optical Element, Optical Element and Display Device", which are herein incorporated by reference.

BACKGROUND

The present invention relates to a method of manufacturing an optical element, notably an optical element for creating a retractable sheet for use in a motor vehicle. The present invention also relates to an optical element, notably an optical element for creating a retractable sheet for use in a motor vehicle, and also to a display device, notably for motor vehicles.

Display devices using the head-up display principle have been in routine use in the field of motor vehicles for a few years now.

Head-up display devices allow information to be projected into the field of view when looking at the space in front of the motor vehicle so that the driver of the motor vehicle can read this information without taking his eyes off the space in front of the motor vehicle. At the same time, the driver of the motor vehicle can read the information without his eyes having to accommodate.

Certain display devices use the windshield in order to project the information into the field of view when looking at the space in front of the motor vehicle. Although such a device might in theory appear to be advantageous, particularly as regards the number of components needed, the inclination of the windshield or of any other window in a motor vehicle meets aerodynamic criteria or criteria concerned with the mechanical strength/stability of the motor vehicle and thus does not always offer an angle of inclination that is advantageous for the positioning of the display in the field of view of the driver of the motor vehicle. For this reason, certain motor vehicles have been fitted with head-up display devices that comprise an independent reflective sheet.

In order to be used in such a way, an optical element, acting as a retractable sheet in a motor vehicle display device, needs to have optical properties which are such that the optical element is at least partially reflective and/or at least partially transparent. Such optical properties can be achieved using functional coatings, notably reflective or non-reflective coatings (which allow or increase the transmission of light through the optical element).

An optical element according to the present invention may also be referred to as a disk or a sheet or even a combiner because it superposes (or combines) optical information about the field of view of the space in front of the motor vehicle with information from the display device.

Such an optical element is normally manufactured using a three-dimensional forming process, notably a thermoforming process, for example injection molding. Such methods of manufacturing a three-dimensional optical element are generally known.

One disadvantage with such a method is that, in the prior art, the methods of manufacturing optical elements normally intend a step of milling at least one edge surface of the optical element. Such a step of modifying the surface of the optical element, notably the edge surface of the optical element, represents a considerable proportion of the costs of manufacturing the optical element.

SUMMARY

It is a notable object of the present invention to overcome the disadvantages of the known art, notably those mentioned hereinabove, and another object of the present invention is to propose a method of manufacturing an optical element, notably an optical element for creating a retractable sheet for use in a motor vehicle, that makes it possible to reduce not only the costs of manufacturing the optical element, but also the time required to manufacture the optical element.

Another object of the present invention relates to an optical element, notably an optical element for creating a retractable screen for use in a motor vehicle.

According to the invention, this object is achieved using a method of manufacturing an optical element, notably an optical element for creating a retractable sheet for use in a motor vehicle, the optical element in its final state having a three-dimensional shape that is the result of a step of forming the optical element, the optical element being intended to have an expansive shape, comprising:
    a first main surface,
    a second main surface, and
    an edge surface of the optical element,
the method of manufacturing the optical element comprising the following steps:
    during a first step of the method, forming the optical element in order to give the optical element its final three-dimensional shape as far as the first main surface, the second main
    surface and the edge surface of the optical element are concerned,
    during a second step of the method, cleaning at least one of the surfaces of the optical element,
    during a third step of the method, applying a functional coating to the first main surface and/or the second main surface.

With such a method of manufacture it is advantageously possible to manufacture the optical element more simply and less expensively, notably by avoiding a step of milling the edge region of the optical element (or the edge surface of the optical element).

Moreover, it is advantageously possible according to the present invention to manufacture the optical element with lower investment costs because at least one step of the manufacture can be avoided.

According to one preferred embodiment of the present invention, it is intended that the third step of the method involves applying the functional coating using a process for applying the functional coating that uses vacuum deposition.

A preferred enhancement of the invention also lies in the fact that the forming of the optical element during the first step of the method is performed using thermoforming.

According to another preferred embodiment of the present invention, it is intended that the forming of the optical element during the first step of the method is carried out using injection molding.

A preferred enhancement of the invention also lies in the fact that the forming of the optical element during the first step of the method is carried out using a stamping process and/or an extrusion process.

With such embodiments of the method of manufacture it is advantageously possible according to the present invention to define the three-dimensional shape of the optical element as freely as possible and in a way that is best suited to the functional requirements of the application of the optical element, notably in a motor vehicle.

According to another preferred embodiment of the present invention, it is intended that the edge surface of the optical element is not changed any further after the first step of the method.

Moreover, according to the present invention it is preferable for the edge surface of the optical element to have a predetermined finish or a predetermined roughness (or a predetermined surface finish). The finish or roughness can be expressed using VDI values, which correspond to a VDI roughness scale (VDI =Verein Deutscher Ingenieure, or "The Association of German Engineers"), which corresponds to roughness values measured in micrometers for various classes of surface: these are referred to as "arithmetic roughness average" or "Ra" values. The equivalence is as follows: VDI 10: 0.32 µm; VDI 12: 0.4 µm; VDI 15: 0.56 µm; VDI 18: 0.8 µm; VDI 21: 1.12 µm; VDI 22: 1.26 µm; VDI 24: 1.6 µm; VDI 27: 2.24 µm; VDI 30: 3.15 µm; VDI 33: 4.5 µm; VDI 36: 6.3 µm; VDI 39: 9 µm; VDI 42: 12.5 µm; VDI 45: 18 µm. According to the present invention it is preferable to use edge surface finishes (or roughnesses) in the class (or standard) VDI 27 (Ra 2.24 um) up to VDI 36 (Ra 6.3 um).

A preferred improvement of the invention also lies in the fact that the optical element is an element made of plastics material, preferably made of thermoplastics material.

The present invention also relates to an optical element, notably an optical element for creating a retractable sheet for use in a motor vehicle, the optical element in its final state having a three-dimensional shape that is the result of a step of forming the optical element, the optical element having an expansive shape, comprising the optical element being intended to have an expansive shape, comprising:
 a first main surface,
 a second main surface, and
 an edge surface of the optical element,
the optical element being obtained using a method according to the present invention.

According to another preferred embodiment of the present invention, it is intended that the edge surface of the optical element comprises at least one part of convex shape, i.e. that curves toward the outside.

Thus it is advantageously possible according to the present invention for the edge surfaces (i.e. those surfaces that are not the main surfaces of the optical element which is generally expansive along a main plane of expansion) not to cause any disruption to the optical behavior of the optical element in its practical application.

The present invention also relates to a device for manufacturing an optical element according to the present invention, with the aid of which the optical element is formed with three dimensions, this being the result of a step of forming the optical element, the optical element being intended to have an expansive shape, comprising:
 a first main surface,
 a second main surface, and
 an edge surface of the optical element,
the device for manufacturing the optical element being intended to be such that during the forming of the optical element the latter is given its final three-dimensional shape as far as the first main surface, the second main surface and the edge surface of the optical element are concerned.

Such a device for manufacturing an optical element may, for example, be a forming tool, notably using an injection molding process.

Moreover, the present invention also relates to a display device, notably for a motor vehicle, comprising a projection module for generating an image for the purposes of projecting it along an optical path in the normal direction in which a user of the display device would be looking, the display device comprising an optical element, the optical element having an expansive shape comprising:
 a first main surface,
 a second main surface, and
 an edge surface of the optical element,
the optical element in its final state having a three-dimensional shape which is the result of a step of forming the optical element, the optical element being obtained using a method according to the present invention.

According to another preferred embodiment of the present invention, it is intended that the optical element can be moved between a first, rest, position and a second, display, position, the optical element in its display position lying in the normal direction in which the user would be looking.

Further features and advantages of the invention will become apparent from reading the following description of one nonlimiting particular embodiment of the invention.

BRIEF DESCRIPTION OF THE DRAWINGS

The invention will be better understood by virtue of the following description, which relates to preferred embodiments given by way of nonlimiting examples and which are explained with reference to the attached schematic drawings in which.

DESCRIPTION OF THE DRAWINGS

As FIGS. 1 to 5 of the attached drawings show, an optical element 1 can be manufactured in a simple and effective way using a method of manufacture according to the present invention.

The optical element 1 is, for example, used as an optical element for creating a retractable sheet for use in a motor vehicle. Such optical elements are notably used in motor vehicles that have a display device comprising a projection module for generating an image for the purposes of projecting it in the normal direction in which a user of the display device would be looking In general, the optical element has an expansive shape comprising:
- a first main surface,
- a second main surface, and
- an edge surface of the optical element.

According to the method of manufacture according to the present invention, the optical element 1 has a three-dimensional shape that is the result of a step of forming the optical element 1, the optical element being obtained using a method comprising the following steps:

- during a first step of the method, forming the optical element 1 in order to give the optical element 1 its final three-dimensional shape as far as the first main surface, the second main surface and the edge surface of the optical element 1 are concerned,
- during a second step of the method, cleaning at least one of the surfaces of the optical element 1,
- during a third step of the method, applying a functional coating to at least the first main surface and/or at least the second main surface.

Figure 1:
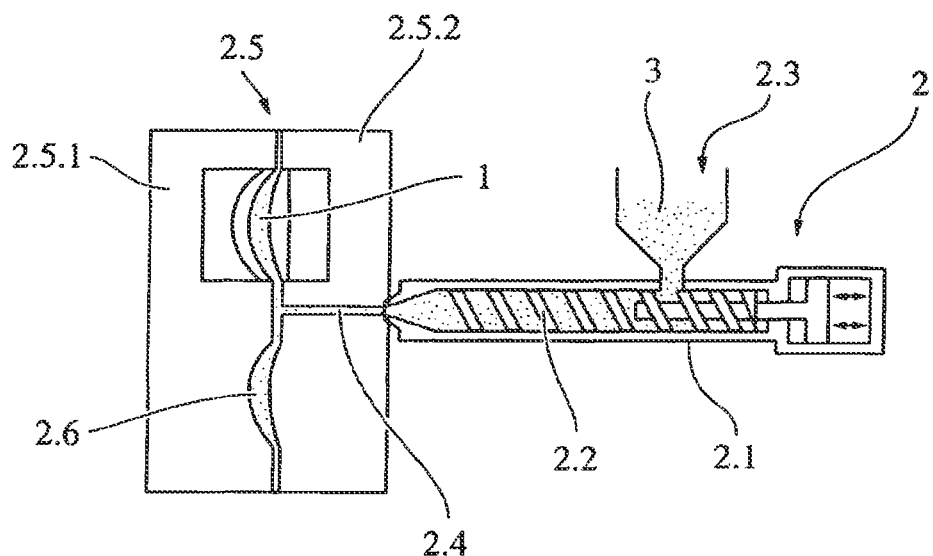
FIG. 1 is a schematic view in section of a device for manufacturing an optical element according to the present invention.

The first step in the method according to the present invention is depicted in FIG. 1 which shows a schematic view in section of a device 2 for manufacturing an optical element 1 according to the present invention. The manufacturing device 2 is, for example, provided in the form of a device for injection molding a plastics material. Such a plastics material may, for preference, be thermoformed.

The manufacturing device 2 comprises a barrel 2.1, a screw conveyor 2.2, a loading hopper 2.3, an injector 2.4 and a two-part molding tool 2.5 comprising a first part 2.5.1 and a second part 2.5.2. Granules 3 of plastics material are supplied to the manufacturing device 2 via the loading hopper 2.3 and conveyed by the screw conveyor 2.2 to the barrel 2.1 of the manufacturing device 2. Through the action of the screw conveyor 2.2 and also by way of the barrel 2.1 which is heated, the granules 3 are heated also to constitute a molten mass of plastics material at the tip of the screw conveyor 2.2 in the barrel 2.1.

During an injection phase, the screw conveyor 2.2 is pressurized (either mechanically or hydraulically or by a combination of both) so that the molten mass of plastics material (i.e. the granules 3 in their molten state) is driven, by the application of a comparatively high pressure and through the injector 2.4, into a cavity 2.6 between the two parts 2.5.1, 2.5.2 of the molding tool 2.5 of the manufacturing device 2.

The cavity 2.6 between the two parts 2.5.1, 2.5.2 of the molding tool 2.5 (in its closed state) of the manufacturing device 2 is intended to give the optical element 1 its final shape notably having with edge surfaces of the optical element 1 in such a way that these have their final shape, notably having edges of convex shape. Through such a step of forming the optical element 1, it is possible to avoid the step of milling the edges of the optical element 1.

Depending on the desired shape for the optical element 1, the molding tool 2.5 (and its two parts 2.5.1, 2.5.2) is intended to define a cavity 2.6 that is such as to give the optical element 1, leaving the forming step, edge surfaces that have curvatures with a radius of, for example, between 1 mm and 10 mm, i.e. for example of 1 mm or 2 mm or 3 mm or 4 mm or 5 mm or 6 mm or 8 mm or 10 mm.

The parts 2.5.1, 2.5.2 of the molding tool 2.5 are notably formed in such a way that they define the cavity 2.6 in their closed state such that the risk of any flash forming is reduced, for example through the provision of shapes of the first and second part 2.5.1, 2.5.2 of the molding tool 2.5 that fit together closely.

The edge surface of the optical element according to the present invention preferably has a predetermined finish or a predetermined roughness (or a predetermined surface finish). For example, it is preferable for the edge surface of the optical element to have a finish:
- ranging from class (or standard) VDI 27 (Ra 2.24 um) up to standard VDI 36 (Ra 6.3 um).

Moreover, the step of forming the optical element 1 may also be carried out using another forming process, notably a thermoforming process, by pressing and/or by extrusion.

Figure 2:
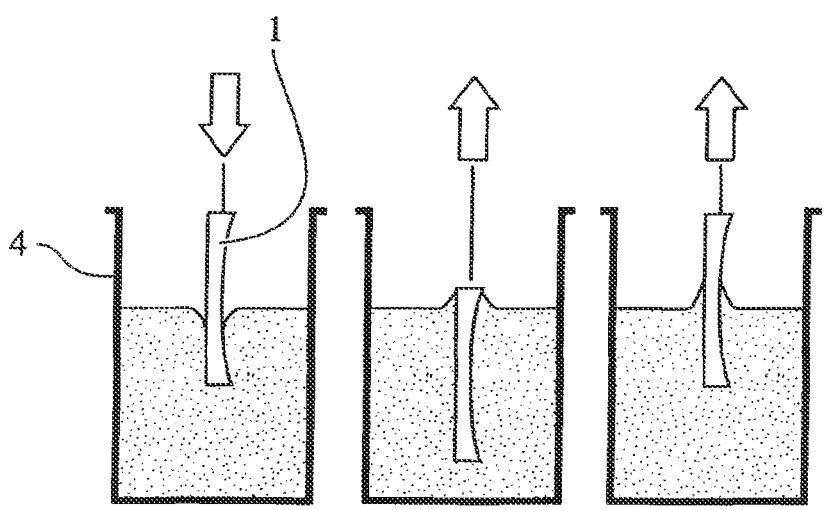
FIG. 2 is a schematic view in section of a device for cleaning and/or for applying a coating to a surface of the optical element.

FIG. 2 shows a second step of the method of manufacture according to the present invention. In this step, the optical element 1 (leaving the manufacturing device 2) is cleaned on at least one of the surfaces of the optical element 1. The second step may also comprise a step of applying a functional coating (notably by immersion in an immersion device 4).

In another embodiment of the present invention, the optical element 1 may also be treated, during the second step of manufacture, using another cleaning and/or deposition process.

Figure 3:
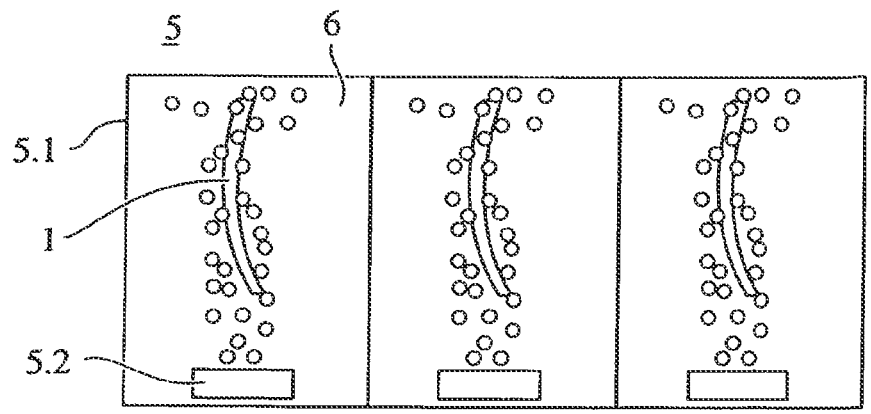
FIG. 3 is a schematic view in section of an ultrasound device for cleaning the optical element according to the present invention.

FIG. 3 shows another step in the manufacture of the optical element 1 which intends a cleaning of the optical element 1 in a bath in an ultrasound device 5.

The ultrasound device 5 comprises a tank 5.1 which, for example, contains water 6 which is, for example, distilled or ionized. Within the tank 5.1, an ultrasound generator 5.2 generates ultrasound waves by means of which the optical element 1 is cleaned.

Figure 4:
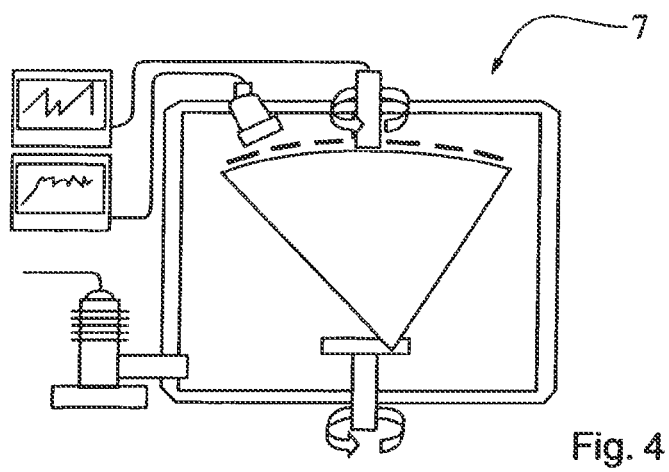
FIG. 4 is a schematic view in section of a device for the vacuum deposition of a functional coating on at least one surface of the optical element according to the present invention.

FIG. 4 shows a third step in the manufacture of the optical element 1 using a device 7 for the vacuum deposition of a functional coating on at least one surface of the optical element 1 according to the present invention. The functional coatings are notably optical coatings which give the surfaces thus treated reflective or non-reflective properties.

Figure 5:
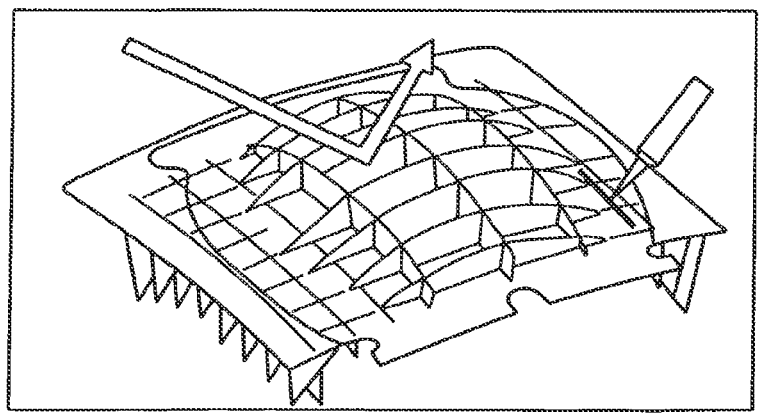
FIG. 5 is a schematic view in perspective of three-dimensional data for testing the properties of the optical element according to the present invention.

FIG. 5 shows another, checking step, for checking the properties, notably the quality of the three-dimensional forming of the optical element 1. Optical properties of the optical element 1 are checked using three-dimensional data.

The invention claimed is:

1. A method of manufacturing an optical element for creating a retractable sheet for use in a motor vehicle, the optical element having an expansive shape, and the optical element comprising:
   - a first main surface corresponding to the expansive shape;
   - a second main surface opposed to the first main surface; and
   - an edge surface connecting the first main surface and the second main surface and including a convex shape that curves toward the first main surface, the second main surface, or a combination thereof;
   - the method of manufacturing the optical element comprising:
   - forming the optical element to give the optical element a three-dimensional shape provide by the first main surface, the second main surface, and the edge surface;
   - cleaning at least one of the first main surface, the second main surface, and the edge surface; and
   - applying a functional coating to the first main surface and/or the second main surface;
   - wherein the optical element has the three-dimensional shape in a final state of the optical element.

2. The method of manufacture as claimed in claim 1, wherein applying the functional coating comprises applying the functional coating using a process that uses vacuum deposition.

3. The method of manufacture as claimed in claim 2, wherein the functional coating has a reflective or non-reflective property.

4. The method of manufacture as claimed in claim 1, wherein forming the optical element comprises forming the optical element using thermoforming.

5. The method of manufacture as claimed in claim 1, wherein forming the optical element comprises forming the optical element using injection molding.

6. The method of manufacture as claimed in claim 1, wherein forming the optical element comprises forming the optical element using a stamping process.

7. The method of manufacture as claimed in claim 1, wherein the edge surface is not changed any further after forming the optical element.

8. The method of manufacture as claimed in claim 7, wherein the edge surface has a roughness between Ra 2.24 um and Ra 6.3 um.

9. The method of manufacture as claimed in claim 1, wherein the optical element is an element made of a plastic material.

10. The method of manufacture as claimed in claim 9, wherein the plastic material comprises a thermoplastic material.

11. The method of manufacture as claimed in claim 1, wherein forming the optical element comprises forming the optical element using an extrusion process.

12. The method of manufacture as claimed in claim 1, wherein cleaning at least one of the first main surface, the second main surface, and the edge surface, and applying the functional coating are performed by immersion in an immersion device.

* * * * *